June 26, 1934.  C. E. JOURNEY  1,963,995
DRAFT DOOR FOR ORCHARD HEATERS
Filed Feb. 21, 1931
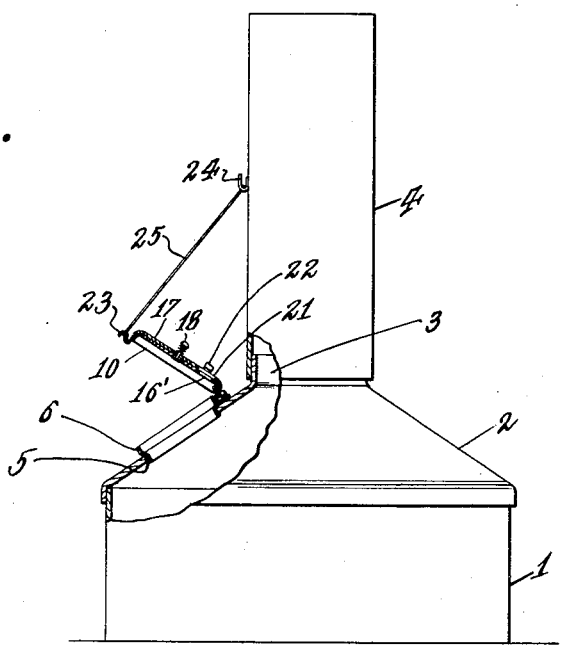
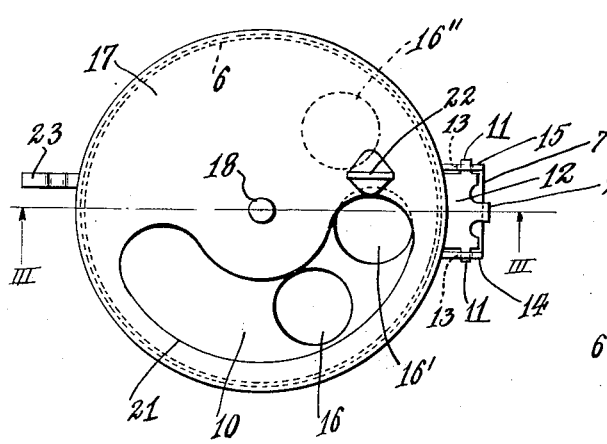
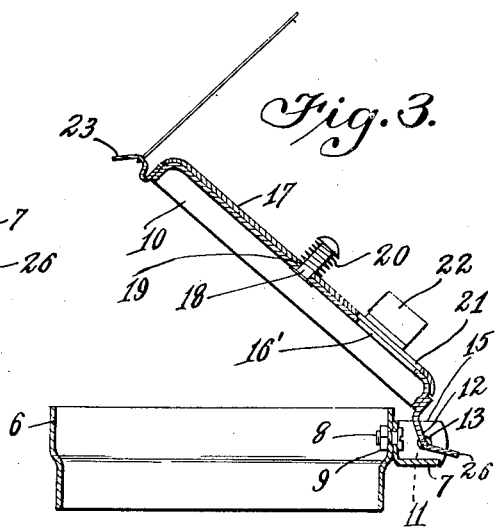
Inventor
Clarence E. Journey
By Lyon & Lyon
Attorneys Patented June 26, 1934

1,963,995

UNITED STATES PATENT OFFICE 1,963,995

DRAFT DOOR FOR ORCHARD HEATERS

Clarence E. Journey, Los Angeles, Calif., assignor to John F. Mahlstedt, Los Angeles, Calif.

Application February 21, 1931, Serial No. 517,412

12 Claims. (Cl. 126—59.5)

My invention relates to agricultural heaters and has particular reference to heaters employed in orchards in some localities for frost prevention.

It is common practice in the agricultural industry to employ heaters distributed throughout an orchard or agricultural field for the purpose of producing heat, preventing injury to plants, trees and fruit from low temperature conditions. Such agricultural establishments equipped with heaters of this character ordinarily employ as a fuel either coke, or a low grade fuel oil, and require that an attendant shall personally ignite each of the heaters after which it is necessary for the same, or another, attendant to return to the heater after it is ignited and is burning properly to adjust the draft therefor to produce the correct amount of draft for proper combustion.

This procedure requires that there shall be two trips made by the attendant to each of the heaters to be ignited, the first trip requiring the opening of the heater and igniting the same, while the second trip is required for the adjustment of drafts.

It is, therefore, an object of my invention to provide an agricultural heater in which the heater may be ignited and the draft door set to a desired position for initial igniting of the heater and which, when the heater becomes properly ignited, will automatically adjust the draft to the required amount.

Another object of my invention is to provide a draft door construction for agricultural heaters in which the door may be initially opened or set for the required amount of draft for igniting and which will automatically reduce the draft to the desired value after the heater is ignited.

Another object of my invention is to provide an attachment for agricultural heaters in which a substitute draft door is provided for that ordinarily found upon the heater, and which may be initially operated to produce the required draft for igniting, and which will automatically adjust itself to the required amount of draft after ignition.

Other objects of the invention will be apparent from a study of the following specification read in connection with the accompanying drawing, wherein Figure 1 is a side elevational view of an orchard heater illustrated partly in section and illustrating a draft door constructed in accordance with my invention;

Figure 2 is a detail plan view of the draft door constructed in accordance with my invention; and Figure 3 is a detail sectional view of the draft door illustrated in Figure 2.

Referring to the drawing, I have illustrated an agricultural heater as comprising a base 1 constituting a container for fuel oil which is to be employed in the heater, this base being usually cylindrical in shape and having secured thereto a cover portion 2 terminating in a relatively small flanged opening 3, to which may be attached a stack 4 extending upwardly through which the flames and smoke from the heater may pass.

At some suitable point on the cover portion 2 a draft opening 5 is provided, this draft opening comprising a substantially circular opening cut into the cover portion 2 and being ordinarily provided with a hinged cover plate or door which will be normally closed while the heater is not in operation to prevent evaporation of the oil or other fuel employed in the heater.

Referring, particularly, to Figure 1, it will be observed that I have provided a draft door construction which comprises an adaptor ring 6 which has at least one portion thereof having the proper outside diameter to fit snugly within the draft opening 5 so as to make a tight frictional engagement with the edges of such opening. The adaptor ring 6, in the form illustrated, comprises an annulus having two diameters, the greater of which constitutes the upper end of the ring 6 and has secured at one side thereof a hinge 7. This hinge may be secured to the adaptor ring in any suitable fashion, although I prefer to attach the same as by means of a screw 8 and nut 9 so that the same may be readily removed, if desired.

A draft door 10 is pivotally secured to the hinge 7, as by means of inserting a pair of lugs 11 formed upon a plate 12 through suitable circular openings 13 in upstanding ears 14 and 15, respectively, which may be formed integrally with the hinge 7. While I have illustrated the plate 12 as being a separate element from the door 10, it will be understood that this plate may be formed integrally with the door, if desired.

The draft door 10 is illustrated as comprising a substantially cup-like structure, the upper surface of which is substantially flat and is provided with a plurality of draft openings 16, 16' and 16'' therethrough, these openings being of such size as will provide the maximum amount of draft for the heater while it is in operation.

Attached to the draft door 10 is a rotatable plate 17, the attachment constituting a rivet 18 secured to the draft door 10 and passing through a central opening 19 in the plate 17 having interposed between the head of the rivet 18 and the plate 17 a spring 20 to insure that the plate will remain in the position to which it may be rotated relative to the door 10.

The plate 17 is provided with one or more openings 21 so arranged as to be capable of being aligned with the openings 16, 16' etc., in the draft door when the plate 17 is rotated to such position as to align those openings. In the particular form of the device illustrated, the opening 21 is illustrated as being an elongated slot having a general contour concentric with the plate 17 so that by rotating the plate 17 relative to the draft door 10, one or more of the openings 16 may be exposed to the atmosphere, while the remaining openings in the door 10 will be obstructed.

If desired, a suitable handle 22 may be provided upon the plate 17 to permit ready access to the plate to move it to whatever adjusted position is desired.

A hook 23 is provided upon the door 10, preferably arranged diametrically opposite to the point of attachment of the hinge plate 12. The hook 23 may, like the plate 12, be formed either as a separate element secured to the door 10, or may be formed integrally therewith.

The operation of the device thus far described is as follows: An orchard or agricultural heater equipped with my draft door assembly may be filled to the desired level with the fuel to be employed therein and placed in position in the agricultural field. The door 10 will normally be in closed position, that is, rotated about its hinge 7 so that the cup-like door seats upon the adaptor ring 6 and prevents ingress of air to the interior of the heater. During such times, it is preferable that the plate 17 shall be moved to such position that all of the draft openings 16, 16' etc., in the door 10, shall be covered by the solid portions of the plate thus to insure minimum amount of evaporation or deterioration of the fuel material employed.

When it is desired to ignite the heater, an attendant may open the door 10 properly to ignite the fuel contained in the base 1. The door may be retained in the open position, as by means of connecting the hook 23 to a corresponding hook 24, secured to the stack 4 of the heater, or to any other suitable portion of the heater which will be affected by the heat generated in the heater while it is burning. The connection between the hook 23 and the hook 24 is preferably made through some material which deteriorates or burns or fuses under the influence of heat, this connecting device being illustrated in the drawing as comprising an elastic or rubber band 25 of the character commonly used in offices for securing papers in a compact bundle.

At the time of igniting the fuel in the burner, the attendant may move the plate 17 to such position as will expose such perforation of the draft openings 16, 16' etc., in the door 10 as his experience indicates will be required to provide just that amount of air for maintaining the proper combustible mixture in the heater without diminishing the heat and without producing unnecessary smoke.

While during the initial operation of the heater it is essential that an excess draft be supplied to insure the starting of gassification of the fuel or to insure the quick ignition and spread of combustion in the fuel necessary to produce the most efficient heat therefrom, this excess draft is only required for relatively short periods of time, after which the draft should be reduced in order to produce an efficient heat.

After igniting the fuel and setting the draft door 10 in its open position, as by means of the elastic band 25, the attendant may then leave the heater which, as soon as complete ignition takes place will produce a quantity of heat adjacent the hook 24 to destroy the elastic band or similar device which has been employed to hold the door 10 in open position, whereupon the door 10 will fall by gravity to its closed position but the draft openings 16 and 16' will remain open to insure just that amount of draft required to maintain the heater burning efficiently.

The amount of initial opening of the draft door 10 may be adjusted as by means of adjusting the extreme end 26 of the plate 12 to engage the outer edge of the hinge 7 and thus to act as a stop preventing the opening of the door 10 beyond a predetermined amount. It will be apparent, therefore, that by providing a draft door as herein described, only one operation by an attendant is necessary, namely, the opening of the draft door and securing the same in open position by means of the elastic band after which he may ignite the fuel. The subsequent reduction of draft is rendered automatically as the heat generated by the heater destroys the elastic band.

While I have illustrated and described the preferred embodiment of my invention, I do not desire to be limited to any of the details shown or described herein, except as defined in the appended claims.

I claim:

1. In an agricultural heater, a fuel burner, a draft opening in said burner for admitting air to said burner, a door for said opening movable relative thereto to open or close said opening, said door having one or more relatively limited draft openings therein to limit ingress of air when said door is closed, and means destructible by heat from said burner for supporting said draft door in open position wherein a relatively large quantity of air is allowed to enter said burner during the starting of the operation thereof, said door permitting a relatively reduced amount of air when in closed position and during the continuance of the operation of said burner.

2. In an agricultural heater, a fuel burner, a draft opening in said burner for admitting air to said burner, a door for said opening hinged to said burner, said door having one or more relatively limited draft openings therethrough to limit ingress of air when said door is closed, and means destructible by heat from said burner for supporting said draft door in open position wherein a relatively large quantity of air is allowed to enter said burner during the starting of the operation thereof, said door permitting a relatively reduced amount of air when in closed position and during the continuance of the operation of said burner.

3. In an agricultural heater, a fuel burner, a draft opening in said burner for admitting air to said burner, a door for said opening movable relative thereto to open or close said opening, said door having one or more relatively limited draft openings therein to limit ingress of air when said door is closed, means for adjustably limiting the effective amount of said draft door opening to regulate the draft, and means destructible by heat from said burner for supporting said draft door in open position.

4. In an agricultural heater, a fuel burner, a draft opening in said burner for admitting air to said burner, a door for said opening movable relative thereto to open or close said opening, said draft door comprising a plate hinged to said burner and having one or more limited draft openings therethrough, a plate secured to said door and movable relative to the draft openings therein to regulate the effective draft opening in said door, and means destructible by heat from said burner for supporting said draft door in open position wherein a relatively large quantity of air is allowed to enter said burner during the starting of the operation thereof, said door permitting a relatively reduced amount of air when in closed position and during the continuance of the operation of said burner.

5. In an agricultural heater, a fuel burner, a draft opening in said burner for admitting air to said burner, a door for said opening movable relative thereto to open or close said opening, said draft door comprising a substantially circular base plate of metal of a size to cover said draft opening in said burner and having one or more limited draft openings perforating said plate, a second plate pivotally secured to said base plate and movable relative to said opening in said base plate to cover all of said openings or to expose any desired area thereof, and means destructible by heat from said burner for supporting said draft door in open position wherein a relatively large quantity of air is allowed to enter said burner during the starting of the operation thereof, said door permitting a relatively reduced amount of air when in closed position and during the continuance of the operation of said burner.

6. In an agricultural heater, a fuel burner, a draft opening in said burner for admitting air to said burner, a ring insertable in said draft opening, a draft door hinged to said ring to close said opening, said door having one or more relatively limited draft openings therein to limit ingress of air when said door is closed, and means destructible by heat from said burner for supporting said draft door in open position.

7. In an agricultural heater, a fuel burner, a draft opening in said burner for admitting air to said burner, a door for said opening movable relative thereto to open or close said opening, said door having one or more relatively limited draft openings therein to limit ingress of air when said door is closed, a hook on said door, a hook secured to said burner in heat conducting relation thereto, and means destructible by heat from said burner connecting said hooks to support the door in open position until said means is destroyed.

8. An attachment for orchard heaters comprising a draft door having one or more draft openings therein, an adaptor ring insertable in the draft opening of the heater, a hinge connecting said door to said ring and heat destructible means for supporting said door in open position relative to said ring.

9. An attachment for orchard heaters comprising a draft door having one or more draft openings therein, an adjustable plate movably secured to said door to cover and uncover the openings therein, an adaptor ring insertable in the draft opening of the heater, a hinge connecting said door to said ring and heat destructible means for supporting said door in open position relative to said ring.

10. In combination with a heater of the character described having a combustion chamber and a draft means for admission of air thereto: door means operative to admit a relatively large quantity of air through said draft means during the initial firing of said heater; and means destructible by heat produced by said heater in reaching a normal operating temperature for permitting a movement of said door means to a position admitting a relatively reduced quantity of air to said heater.

11. A device as defined in claim 10, in which said destructible means comprises a heat destructible link connected to said door means and to an external part of said heater in a position to receive heat from said heater.

12. In combination with an orchard heater having a combustion chamber and a draft means for admission of air thereto: door means for said draft means operative between relatively open and closed positions; and control means maintaining said door means in relatively open position during the initial firing of the heater from cold condition, said control means being destructible by heat produced by said heater in reaching a normal operating temperature and in consequence thereof causing movement of said door means to relatively closed position.

CLARENCE E. JOURNEY.